United States Patent [19]
Polulyakh et al.

[11] 3,733,518
[45] May 15, 1973

[54] DEVICE FOR DETECTING FAULTS IN ROTARY ELECTRIC CIRCUITS OF BRUSHLESS EXCITERS OF SYNCHRONOUS MACHINES

[76] Inventors: Valentin Stepanovich Polulyakh, ulitsa II Pyatiletki, 19, kv. 118; Viktor Nilolaevich Khodkevich, ulitsa Frantisheka Krala, 35, kv. 8; Viktor Grigorievich Yakovenko, ulitsa Mira, 62, kv. 35; Vasily Semenovich Kildishev, ulitsa Plekhanovskaya 41, kv. 55, all of Kharkov, U.S.S.R.

[22] Filed: Mar. 3, 1972

[21] Appl. No.: 231,671

[52] U.S. Cl..................317/13 R, 318/180, 322/99
[51] Int. Cl..................................................H02h 7/06
[58] Field of Search..................317/13 R; 324/34, 324/158 MG, 51; 322/99; 321/5; 318/180

[56] References Cited
UNITED STATES PATENTS
3,435,327    3/1969    Merhof et al.....................322/99

*Primary Examiner*—James D. Trammell
*Attorney*—Eric H. Waters et al.

[57] ABSTRACT

The proposed device includes an induction pickup for checking the circuits under control mounted close to these rotary circuits conducting an electric current. The output of the induction pickup of the controllable circuits is connected to one of the inputs of a signal distributing unit made in the form of a trigger counter whose outputs are connected to a diode matrix. Connected to the other input of the signal distributing unit is the output of an interrogation pulse shaping unit. The output of the signal distributing unit is connected to the inputs of a unit for controlling and indicating the condition of the circuits under control employed for light signalling about a fault and for sending signals to the system for automatic control and protection of the exciter and the synchronous machine excited thereby.

3 Claims, 5 Drawing Figures

DEVICE FOR DETECTING FAULTS IN ROTARY ELECTRIC CIRCUITS OF BRUSHLESS EXCITERS OF SYNCHRONOUS MACHINES

The present invention relates to devices for detecting faults in rotary electric circuits of brushless exciters of synchronous machines.

Known in the art is a device for detecting faults (fuse blowing) in rotary electric circuits of a brushless exciter of a synchronous machine with the aid of $n$ stationary coils mounted on U-shaped cores installed near the rotary circuits of the rectifier of the brushless exciter and $m$ stationary switching coils mounted on U-shaped stationary cores arranged near the rotary magnetic element disposed on the periphery of the rotor.

This device is disadvantageous in a large quantity of $n$ and $m$ stationary coils necessary in systems employing multiphase or three-phase brushless exciters, each phase having a plurality of branches, or in systems built around bridge-circuit rectifiers a fuse being provided in each branch of this rectifier.

An increase in the amount of coils mounted directly on the brushless exciter close to its rotating components and poor access to the above coils during the operation of the exciter increase the probability of their failure. Besides, this fact results in an increase in the quantity of wires connecting the coils with the logical unit of the device, thus increasing the quantity of elements in the logical unit of the device. This reduces the reliability of the device and complicates its operation.

An object of the present invention is to provide a device for detecting faults in rotary electric circuits of a brushless exciter of a synchronous machine which by means of a non-contact method would continuously control the condition of the rotary circuits of a brushless exciter with indication of the ordinal number of a faulty circuit.

Another object of the invention is to send a signal varying as a function of the number of the faulty circuits to a system for automatically controlling and protecting the brushless exciter and the synchronous machine excited thereby.

Still another object of the invention is to eliminate the above mentioned disadvantages.

These and other objects are accomplished in a device for detecting faults in rotary electric circuits of brushless exciter of a synchronous machine comprising an induction pickup for checking the condition of the circuits under control mounted on the stationary part of the brushless exciter close to the circuits being controlled which, according to the invention, is provided with a distribution unit one input of which receives the signals from the induction pickup checking the condition of the circuits under control, while two other inputs receive signals from a unit for shaping interrogation pulses and a unit for shaping starting interrogation pulses, whereas the outputs of the distribution unit are connected to a unit for controlling and indicating the condition of the circuits under control.

It is advisable that in the device for detecting faults in rotary electric circuits of brushless exciters of synchronous machines the unit for shaping interrogation pulses is built around a steel toothed rotor mounted on the shaft of the brushless exciter and having a number of teeth equal to $m-1$ of the circuits under control; a permanent magnet with coils on its poles is preferably mounted near this rotor, the terminals of the coils being connected to the input of a shaper-amplifier.

Besides, it is advisable that in the device for detecting faults in rotary electric circuits of brushless exciters the unit for shaping starting interrogation pulses is built around a single-tooth steel rotor mounted on the shaft of the brushless exciter; a permanent magnet with coils on its poles is preferably mounted close to this unit, the terminals of the coils being connected to the input of a shaper-amplifier.

The proposed device provides for continuous control of the integrity of the fuses of a brushless exciter and this fact enhances the reliability of operation of a synchronous machine equipped with such an exciter.

The possibility of exact indication of a fault in any circuit of the brushless exciter during the operation of the synchronous machine reduces the time necessary for eliminating the fault at a short-term stoppage of the synchronous machine.

The continuous control of the condition of the rotary electric circuits and fast response of the device make it possible to separate a signal acting on the system for automatic control of the brushless exciter, thus quickly changing the operating conditions of the exciter and synchronous machine excited thereby according to a predetermined law and this fact impedes the development of the fault in the brushless exciter and increases the trouble-free operation of the synchronous machine.

The invention will be better understood from the following detailed description of some embodiments thereof, reference being made to the accompanying drawings, in which.

The fault of electric circuits is supposed to be a blowing of fuses, which are inserted in series with semiconductor rectifiers, due to short circuits of the semiconductor rectifiers or their overloading (when the rectifier current exceeds its specified value).

Figure 1:
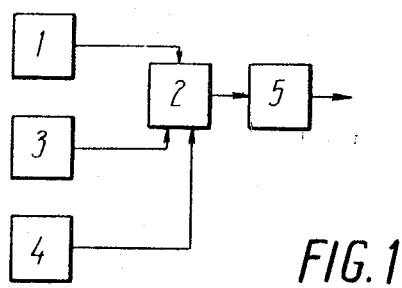
FIG. 1 is a block diagram of the device for detecting faults in rotary electric circuits of brushless exciters of synchronous machines.

The device for detecting faults in rotary electric circuits of brushless exciters of synchronous machines comprises an induction pickup 1 for checking the condition of the circuits under control (FIG. 1) installed close to the rotary electric circuits through which an electric current flows. The output of the induction pickup checking the condition of the circuits under control is connected to one of the inputs of the signal distributing unit 2. The other input of the signal distributing unit 2 is connected to the output of an interrogation pulse shaping unit 3. Starting interrogation pulses from a starting interrogation pulse shaping unit 4 are fed to the third input of the signal distributing unit 2. The outputs of the signal distributing unit 2 are connected to the inputs of a unit 5 for controlling and indicating the condition of the circuits under control which is intended for light signalling about the faults and for sending signals to a system for automatic control and protection of the exciter and the synchronous machine excited thereby.

In the absence of faults in the controllable rotary electric circuits of the brushless exciter a voltage pulse is generated in the induction pickup 1 checking the condition of the circuits under control, which pulse is induced in each circuit passing under the poles of the pickup 1. In this case at the output of the induction pickup 1 checking the condition of the circuits under control there appear voltage pulses the number of which is equal to the number of circuits being controlled. The pulses from the output of the induction pickup 1 checking the condition of the circuits under control are fed to the input of the signal distributing unit 2.

In the initial position all the outputs of the unit 2, except for the second output, are bridged. Owing to this fact, the first pulse from the output of the induction pickup 1 checking the condition of the circuits under control appears only at the first input of the signal distributing unit 2. After passing the first pulse from the output of the induction pickup 1 checking the condition of the circuits under control, a pulse from the interrogation pulse unit 3 is applied to the other input of the signal distributing unit 2 which sets this unit in such a position that all its outputs, except for the second, are bridged. The second pulse from the output of the induction pickup 1 checking the condition of the circuits under control following the first pulse from the interrogation pulse unit 3 will appear only at the second output of the signal distributing unit 2, etc. After the armature of the brushless exciter has made a complete revolution, a pulse from the starting interrogation pulse shaping unit 4 is applied to the third input of the signal distributing unit 2 and the latter is set to its initial position, while the process of distribution of the signals from the output of the induction pickup 1 checking the condition of the circuits under control is resumed. From the outputs of the signal distributing unit 2 the voltage pulses are fed to the inputs of the unit 5 for controlling and indicating the condition of the circuits under control. In the case of failure of one or several rotary electric circuits of the brushless exciter these are deenergized. When the faulty rotary electric circuits pass about the poles of the induction pickup 1 checking the condition of the circuits under control, no voltage pulses appear at its output.

In this connection, there will be no signals at the respective outputs of the signal distributing unit 2 and at the inputs of the control and indication unit 5 which are associated with these outputs of the signal distributing unit 2.

The illuminated indicator boards of the control and indication unit 5 will indicate the quantity and numbers of the faulty circuits. A signal is produced at the output of the control and indication unit 5 which depends on the amount of the faulty circuits and can be used in the system for automatic control of excitation and protection of the machine against overloads.

Given below is a description of the device according to the above-mentioned block diagram with reference to the accompanying drawings which disclose the arrangement of the units 1, 2, 3, 4 and 5 and the electric connection therebetween.

The induction pickup 1 for checking the condition of the circuits under control (FIG. 2) consists of a U-shaped ferromagnetic core with coils at its poles which is mounted on the stationary part of the brushless exciter near its rotary electric circuits 6 so as to obtain the maximum current in the circuits 6 when these circuits move under the pickup 1. At the moment when the electric circuits 6 conducting an electric current pass under the induction pickup 1 checking the condition of the circuits under control, voltage pulses are induced in its coils which are amplified by the amplifier-shaper 7 and are fed to the power supply bar of the diode matrix 8 of the signal distributing unit 2. The signal distributing unit 2 consists of a binary trigger/counter in which the amount of triggers 9 depends on the amount of the circuits 6 under control (in the given case — five triggers 9) and a diode matrix 8 and is intended for separation of the amplified voltage pulses which appear in the induction pickup 1 checking the condition of the circuits under control and for distribution of these pulses through its individual outputs. The signal number of outputs of the distributing unit 2 is equal to the number of the circuits 6 under control (in this case — eighteen outputs).

The output bars of the diode matrix 8 serve as outputs of the signal distributing unit 2. The complementing input of the binary counter of the signal distributing unit 2 is connected to the output of the interrogation pulse shaping unit 3 which consists of a steel toothed rotor 10 mounted on the shaft of the brushless exciter, the amount of teeth 11 being equal to $m-1$ (where m is the number of phases of the multiphase brushless exciter or the number of parallel branches of the three-phase brushless exciter), a permanent U-shaped magnet 12 with a winding 13 which is mounted near the rotor 10 on the stationary part of the exciter, and an amplifier-shaper 14 whose input is connected to the outputs of the winding 13.

The signals from the output of the starting interrogation pulse shaping unit 4, which differs from the interrogation pulse shaping unit 3 in that its rotor 15 has only one tooth 16 facing the tooth replacing space on the rotor 10, are fed to the bar for resetting the binary trigger counter of the signal distributing unit 2.

Figure 4:
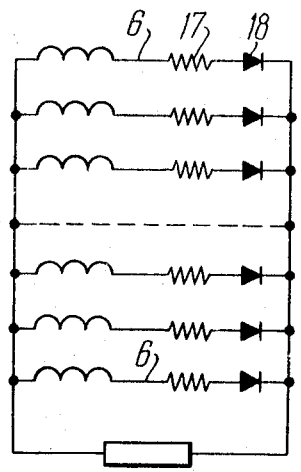
FIG. 4 is a diagram of the half-wave semiconductor rectifier.

The outputs of the signal distributing unit 2 are connected to the inputs of the control and indication unit 5 which is built around of amplifiers (not shown), the quantity of which is determined by the number of the circuits 6 under control (in this specified case — eighteen), each being loaded with an intermediate relay whose contacts are used in the light-signalling circuits and in the system for control and protection of the brushless exciter of the synchronous machine In the absence of faults in the rotary electric circuits 6 of the brushless exciter (the fuses shown in FIG. 4 are not blown up), each circuit 6 passing under the induction pickup 1 (FIG. 2) induces a voltage pulse in the coils of the pickup 1 for checking the condition of the circuits under control.

Thus, during one revolution of the armature of the brushless exciter voltage pulses are induced across the terminals of the coil of the induction pickup 1 checking the condition of the circuits under control, the quantity of these pulses being equal to that of the circuits 6 under control (in this case - eighteen). The voltage pulses are amplified by the amplifier-shaper 7 and are applied to the power supply bar of the diode matrix 8 of the signal distributing unit 2.

In the original position all the outputs of the signal distributing unit, except for the first, are bridged. Owing to this fact, the first pulse of the induction pickup 1 checking the condition of the circuits under control will appear only at the first output of the signal distributing unit 2. After the passage of the first pulse from the induction pickup 1 checking the condition of the circuits under control, an interrogation pulse appears at the output of the interrogation pulse shaping unit 3 and this pulse is applied to the complementing input of the binary trigger counter of the signal distributing unit 2. In this case the trigger counter and, therefore, the diode matrix 8 are switched so that all the outputs of the signal distributing unit 2, except for its second output, are bridged and the second pulse from the induction pickup 1 checking the condition of the circuits under control will appear only at the second output of the signal distributing unit 2. The second pulse from the interrogation pulse shaping unit 3 will commutate the signal distributing unit 2 so that the third pulse from the induction pickup 1 checking the condition of the circuits under control will appear at the third output only, etc. During one revolution of the armature of the brushless exciter at each output of the signal distributing unit 2 there appears a voltage pulse corresponding to the integrity of the circuits 6 under control.

Figure 2:
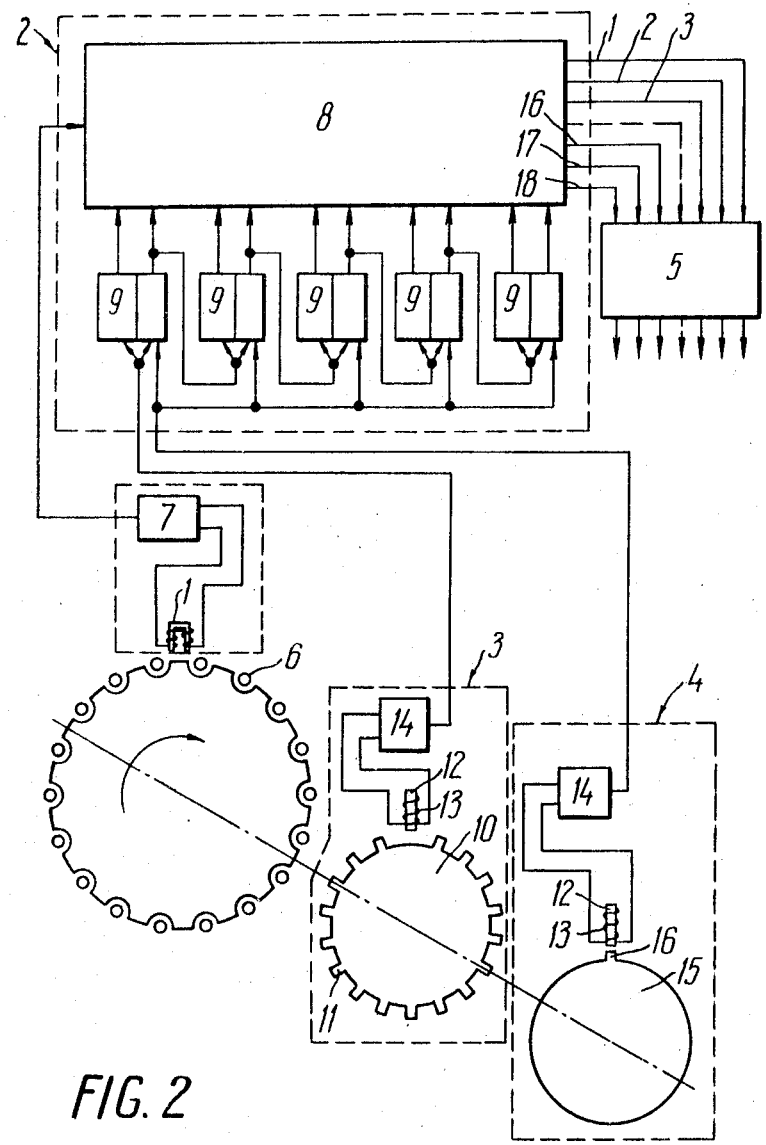
FIG. 2 represents the device for detecting faulty fuses in an eighteen-phase or three-phase brushless exciter, each phase of which has six parallel branches whose rectifier is built around a half-wave rectifying circuit.

After the armature of the brushless exciter has completed one revolution, a pulse appears at the output of the starting interrogation pulse shaping unit 4 which is fed to the bar for resetting the binary counter of the signal distributing unit 2. The signal distributing unit 2 returns to its original position when all its outputs, except for the first, are bridged, and the process of distribution of the signals from the induction pickup 1 checking the condition of the circuits under control is resumed. The device for detecting faults in rotary electric circuits is shown in FIG. 2 at the moment when a pulse appears at the output of the starting interrogation pulse shaping unit 4.

From the outputs of the signal distributing unit 2 the voltage pulses are fed to the inputs of the control and indication unit 5 to energize the intermediate relays. In the case of fault of one or several semiconductor rectifiers 18 of the rectifier unit of the brushless exciter (FIG. 4) they are disconnected by means of fuses 17 and no current flows through the circuits 6 being controlled.

When the deenergized circuits 6 (FIG. 2) to be controlled pass under the induction pickup 1 checking the condition of the circuits under control, no voltage pulses are induced in the winding of the pickup 1. Consequently, there will be no signals at the corresponding outputs of the signal distributing unit 2 and this fact will result in deenergizing the intermediate relays (not shown) inserted at the outputs of the amplifiers whose inputs are connected to the outputs of the signal distributing unit 2 which in this case sends no signal. The relays, when deenergized, through their contacts close the circuits of the signal lamps which indicate the quantity and numbers of the blown-up fuses.

Depending on the method of introducing a signal into the system of automatic control and protection of the machine, there can be employed both normally open and normally closed contacts of the relays.

The outputs of the control and indication unit 5 are composed by the terminals of the contacts of the relays or by the terminals of some combinations of the contacts necessary for acting upon the automatic regulator of excitation and upon the system for protection of the brushless exciter.

Figure 5:
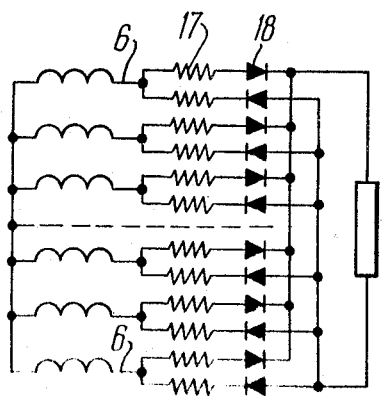
FIG. 5 is a diagram of the bridge semiconductor rectifier.

If the brushless exciter is built around a bridge-circuit rectifier (FIG. 5), the number of fuses is doubled. To control the condition of the additional fuses 17, the system must be modified as follows.

An induction pickup 19, similar to the induction pickup 1, is added to the system for checking the condition of the circuits under control (FIG. 3), the former being shifted in the direction of rotation of the brushless exciter (or opposite to this direction) relative to the pickup 1 for a pole division of the exciter to reverse the polarity of the electric current flowing through the circuits 6 passing under the induction pickup 19 checking the condition of the circuit under control. The terminals of the coil of the induction pickup 19 checking the condition of the circuits under control are connected to the input of an amplifier-shaper 20.

Added into the interrogation pulse shaping unit 3 and into the starting interrogation pulse shaping unit 4 are U-shaped permanent magnets 21 with windings 22 and amplifier-shapers 23 (one permanent magnet and one amplifier shaper for each of said units). The U-shaped permanent magnets 21 with windings 22 must also be shifted relative to the previously installed permanent magnets 12 with windings 13 for a value equal to one pole division of the brushless exciter. Besides the above modifications, the device is provided with a signal distributing unit 24 similar to the signal distributing unit 2 and with a control and indication unit 25 similar to the control and indication unit 5.

Figure 3:
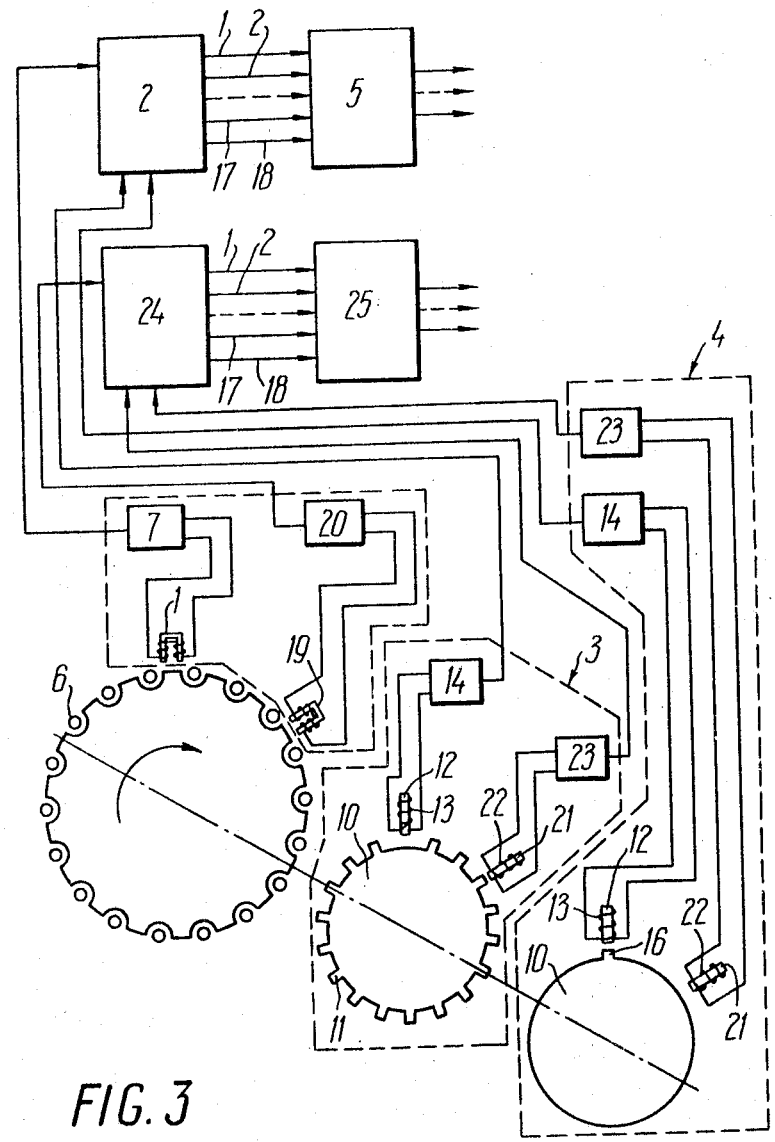
FIG. 3 shows the device for detecting faulty fuses in eighteen-phase or three-phase brushless exciter, each phase of which has six parallel branches whose rectifier is built around a bridge rectifying circuit.

The modified device operates in a similar way as the device shown in FIG. 2 but is distinguished from the latter, which checks the condition of the circuit 6 under control for one half wave only, in that the device shown in FIG. 3 is suitable for checking the condition of the circuits 6 under control during the positive and negative half waves.

We claim:

1. A device for detecting faults in rotary electric circuits of brushless exciters of synchronous machines comprising in combination: a signal distributing unit made in the form of a trigger counter whose outputs are connected to a diode matrix; an induction pickup for checking the condition of the circuits under control mounted on the stationary part of the brushless exciter near the rotary circuits under control; an amplifier-shaper of said induction pickup whose output is connected to the bar for power supply of said diode matrix while the terminals of the winding of the induction pickup checking the condition of the circuits under control are connected to the input of said amplifier-shaper; an interrogation pulse shaping unit whose output is connected to the complementing input of said trigger counter of the signal distributing unit; a starting interrogation pulse shaping unit whose output is connected to the bar for resetting said trigger counter of the signal distributing unit; a control and indication unit whose inputs are connected to the output bars of said diode matrix of the signal distributing unit; said control and indication unit consists of amplifiers the number of which is equal to the number of the circuits under control, each amplifier being loaded with an actuating element sending a signal about faults in the rotary electric circuits to the system for automatic control of the brushless exciter of the synchronous machine.

2. A device for detecting faults in rotary electric circuits of brushless exciters of synchronous machines as claimed in claim 1, in which the interrogation pulse shaping unit consists of a steel toothed rotor mounted on the shaft of the brushless exciter having a quantity of teeth equal to $m-1$ circuits under control; mounted near said unit is a permanent magnet with coils on its poles, the terminals of said coils being connected to the input of an amplifier-shaper.

3. A device for detecting faults in rotary electric circuits of brushless exciters of synchronous machines as claimed in claim 1, in which the starting interrogation pulse shaping unit consists of a steel rotor with a single tooth mounted on the shaft of the brushless exciter; a permanent magnet with coils on its poles is mounted near said unit, the terminals of said coils being connected to the input of the amplifier-shaper.

* * * * *